United States Patent
Pinheiro Pinto Sobreiro

(10) Patent No.: US 11,039,607 B2
(45) Date of Patent: Jun. 22, 2021

(54) MACHINE FOR CAPTURING, COUNTING AND MONITORING INSECTS

(71) Applicant: Luís Filipe Pinheiro Pinto Sobreiro, Viana do Castelo (PT)

(72) Inventor: Luís Filipe Pinheiro Pinto Sobreiro, Viana do Castelo (PT)

( * ) Notice: Subject to any disclaimer, the term of this patent is extended or adjusted under 35 U.S.C. 154(b) by 291 days.

(21) Appl. No.: 16/307,486

(22) PCT Filed: Jun. 6, 2017

(86) PCT No.: PCT/PT2017/000013
§ 371 (c)(1),
(2) Date: Dec. 6, 2018

(87) PCT Pub. No.: WO2017/213531
PCT Pub. Date: Dec. 14, 2017

(65) Prior Publication Data
US 2019/0246616 A1 Aug. 15, 2019

(30) Foreign Application Priority Data
Jun. 7, 2016 (PT) .......................................... 109433

(51) Int. Cl.
*A01M 1/02* (2006.01)
*A01M 1/04* (2006.01)
*A01M 1/10* (2006.01)

(52) U.S. Cl.
CPC ............ *A01M 1/026* (2013.01); *A01M 1/023* (2013.01); *A01M 1/04* (2013.01); *A01M 1/106* (2013.01)

(58) Field of Classification Search
CPC .......... A01M 1/00; A01M 1/026; A01M 1/04; A01M 1/08
(Continued)

(56) References Cited

U.S. PATENT DOCUMENTS 4,410,967 A * 10/1983 Hendricks ............... G01S 15/88
367/108
4,671,114 A * 6/1987 Litzkow ................. A01M 1/026
73/587

(Continued)

FOREIGN PATENT DOCUMENTS

CN 203324781 12/2013
EP 2149301 2/2010
(Continued)

*Primary Examiner* — David J Parsley
(74) *Attorney, Agent, or Firm* — Mark M Friedman

(57) ABSTRACT

The present invention relates to an equipment for attracting, capturing, counting and monitoring flying insects of all species and is particularly applicable to those which cause damage to agricultural crops and are considered to be hazardous to public health and comprises a Ultra Violet lamp in the colorless plastic ring and a pheromone reservoir. The plate with the insect inlet channels houses the Infra-Red sensors and the photographic camera, which in turn is housed in a sealed housing, The upper part which fits in turn in the previously said watertight housing, houses the photovoltaic panel, the microprocessor, the Global Position System GPS receiver, the Global System for Mobile signal transmitter and receiver module, and the Wireless Fidelity—WIFI transmitter and receiver module, a rechargeable battery and a micro USB socket.

6 Claims, 3 Drawing Sheets

Figure 1:
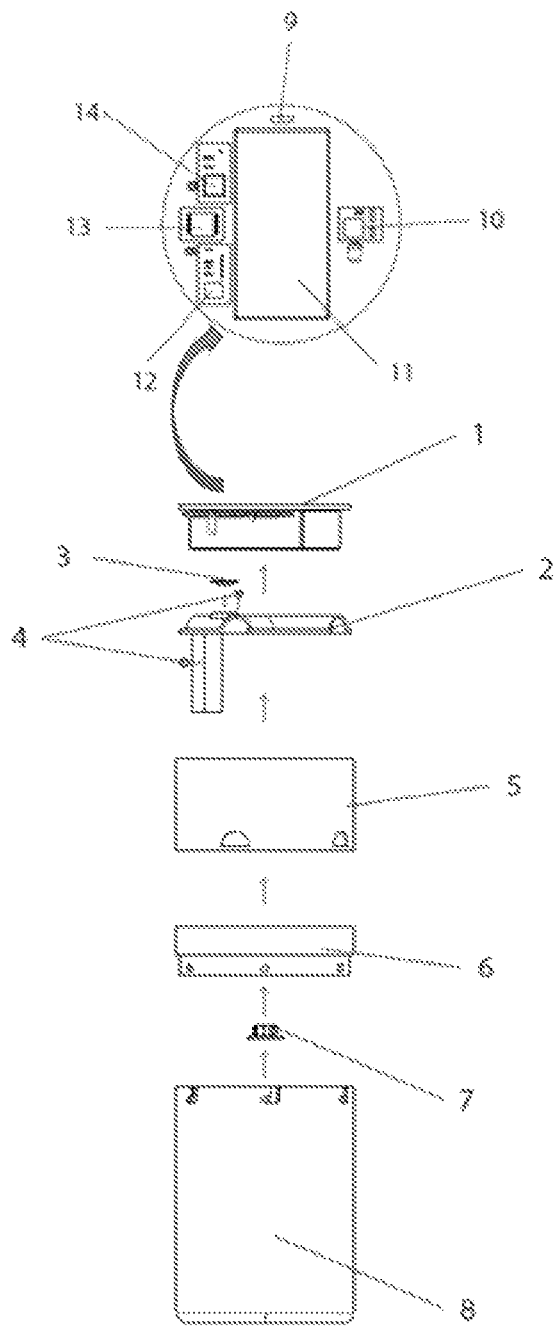

(58) Field of Classification Search
USPC .................................. 43/107, 111, 132.1
See application file for complete search history.

(56) References Cited

U.S. PATENT DOCUMENTS

| | | | | |
|---|---|---|---|---|
| 5,005,416 | A * | 4/1991 | Vick | A01K 67/033 43/121 |
| 5,646,404 | A | 7/1997 | Litzkow et al. | |
| 6,493,363 | B1 * | 12/2002 | Shuman | H04L 29/12009 370/539 |
| 6,882,279 | B2 * | 4/2005 | Shuman | G01N 15/1456 250/336.1 |
| 7,071,829 | B2 * | 7/2006 | Gardner, Jr. | A01M 1/026 250/221 |
| 7,286,056 | B2 * | 10/2007 | Kates | A01M 1/026 250/221 |
| 7,496,228 | B2 * | 2/2009 | Landwehr | A01M 1/026 382/165 |
| 7,937,887 | B2 * | 5/2011 | Child | A01M 1/08 43/139 |
| 8,054,458 | B2 * | 11/2011 | Baker | G01N 21/85 356/237.1 |
| 8,896,452 | B2 * | 11/2014 | Oppenheimer | A01M 1/106 340/573.2 |
| 2013/0204581 | A1 * | 8/2013 | Park | A01M 1/023 702/188 |
| 2013/0250116 | A1 | 9/2013 | Oppenheimer et al. | |
| 2013/0293710 | A1 * | 11/2013 | Afanasyev | H04N 7/18 348/143 |
| 2014/0137462 | A1 | 5/2014 | Rocha | |
| 2015/0173338 | A1 * | 6/2015 | McCammon | A01M 1/106 43/107 |
| 2016/0050901 | A1 | 2/2016 | Pugh | |
| 2016/0245916 | A1 * | 8/2016 | Weber-Grabau | G01B 11/08 |

FOREIGN PATENT DOCUMENTS

WO  2004110142  12/2004
WO  2014037936  3/2014

* cited by examiner

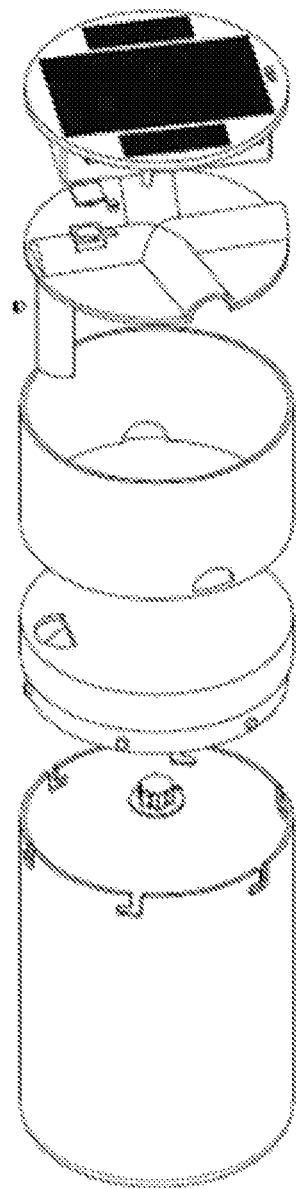
Fig. 1.1

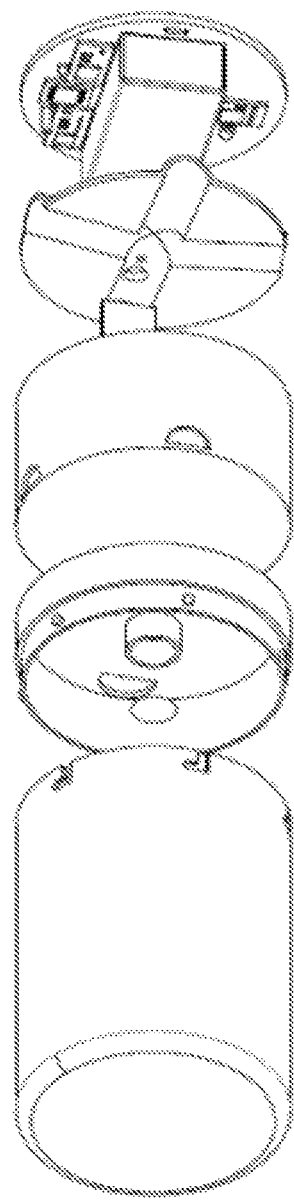
Fig. 1.2

MACHINE FOR CAPTURING, COUNTING AND MONITORING INSECTS

TECHNICAL AREA OF THE INVENTION

The adaptation of technological means to the use of agrarian systems, particularly in the control and monitoring of crop pests, has been presenting increasingly useful solutions for the management and plant protection of farms.

Mass capture methods have been used on farms as a way to control plant damage, reduce the presence of insects harmful to crops, and determine when to start chemical treatments.

In the exploration of large agricultural areas, pest monitoring in the field with the strictest possible accuracy contributes to optimizing the means of struggle and, consequently, to the reduction of the environmental and financial costs associated with the pest control of these pests.

The traditional means of monitoring and determining of the Economic Attack Level (EAL), or the ones that only determine the beginning of the flight times of insects causing damage to the plants and/or fruits, regardless if the EAL had being reached, since it is assumed that this will be the treatment window of the plots, are in general static and require the displacement of a technician to the site to do physical counts and identification of the pest observed.

STATE OF THE ART

The control and monitoring of insect pests on farms is currently done using insect traps that resort to electric traps with Ultra Violet light with electrocuted insect collecting dishes, chronotropic attractants on self-adhesive plates and the pheromone diffusing mosquito bottles Which may also have a complementary chronotropic component. All of these capture equipments are static and do not have interactive technology to monitor the number of insects trapped without involving a competent technician from time to time to the place where the trap is installed.

SUMMARY OF THE INVENTION

The present invention relates to a machine which is configured as a flying insect trap having various attractive techniques, such as chronotropic, light and sexual or food pheromone release, equipped with a set of electronic monitoring and communication sensors from a distance. The solution presented is quite simple in all its physical design, being later supported in computer software of integrated database with external information systems that, will provide the databases on which the plagues will be identified automatically.

Sensitive to Ultra Violet light, the garish colors of the equipment or the aroma emanating from the pheromone placed in the reservoir, the flying insects are attracted to its proximity and eventually find the entrance channels into the equipment. Naturally, they are allowed to be led through the inlet channels until they interrupt the first infrared beam which communicates with the camera located further ahead and as soon as it detects the insect in its focus field it registers an instantaneous image of the insect and then stores it in the microprocessor module until the insect interrupts the second Infra-Red beam located in the downstream segment of the equipment input channel, immediately sending the image registered by Wireless Fidelity (WIFI), or GSM, to the dematerialized server for further processing and analysis of the data in information Which can be easily analyzed. The equipment is equipped with a Global System for Mobile (GSM) receiver and transmitter module in order to receive and transmit data in areas where the WIFI solution does not allow the reception and transmission of data. The invention is further provided with a Global Position System (GPS) receiver so that it can know in real time its position in space and thus determine where the insect catches are occurring. The battery in the upper part of the equipment ensures correct operation of all the electronic components and, in order to allow the equipment to have complete and lasting energy independence, a photovoltaic panel has been fitted on the top of the equipment. A micro USB connection was also installed, which functions simultaneously as a communication and data exchange port and as a power port by external source. This connection is very important for maintenance operations and to access and manage all components in the event of a total power failure.

This invention allows to assemble in a single equipment three types of attractiveness of flying insects, simultaneously making their capture, not letting them leave the pheromone deposit where, through exhaustion, they will eventually drown in the attractive liquid.

Thanks to the global positioning technology (GPS) that is installed, this invention allows the mapping of the catches on the ground while the image sensors and Infra Reds allow to identify the captured species and the number of catches, thus determining the intensity of catches and automatically determine the Economic Attack Level (EAL) in each portion or region monitored. This capacity will enable the decision maker to program the treatments with greater precision and to make the most effective insecticide choice to combat the identified species, thus contributing to the drastic reduction of the means necessary for its combat, be it to the level of chemical insecticides which are not sprayed, at the level of the human hour/machine binomial and the level of aggression that these chemical insecticides would have in the ecosystem if they were sprayed throughout the zone to be protected.

The present invention is hereinafter described in detail, without limitation and by way of example, by means of a preferred embodiment thereof, shown in the accompanying drawings, in which:

FIG. 1 is a schematic sectional representation of the embodiment of the apparatus according to the invention;

FIG. 1.1 and FIG. 1.2 are schematic representations of the apparatus of FIG. 1.

DESCRIPTION OF THE PREFERRED EMBODIMENT

With reference to the figures, the preferred embodiment of the invention will now be described, wherein the apparatus is constituted by a set of organs shown in said figures, assembled as described below.

The present invention is constructed in three distinct sections (5, 6, 8), all in plastic, the upper section with the electronic equipment being housed in a watertight housing (5) in order to protect the electronic components from the action of the elements. The intermediate section 6 is constructed of transparent plastic so that the Ultra Violet light rays emitted by the LED Lamp (7) can disperse, thus fulfilling its attractive insect function with nocturnal flight habits. The lower part of the equipment (8), the pheromone bucket, is constructed of attractive colored plastic to attract certain types of yellow, orange, red or blue colors sensitive insects.

The insects are attracted to the vicinity of the equipment by the action of the three types of attractants used, Ultra Violets, chronotropic and pheromones, later entering the various insect entrance channels (2), which are on the periphery of the equipment, where they are naturally directed towards the infra-red sensor (4) located in the second segment of said insect inlet channel. The said Infra-Red sensor awakens the standby mode of the photographic camera (3) which initiates the monitoring mode and as soon as it identifies the passage of an insect in its focus field it registers an image of the insect. Following its path to reach the origin of Ultra Violet light or the sexual or food pheromone, the insect activates the second Infra-Red sensor (4), which is positioned in the descending part of said insect entrance channel, thereby indication to the equipment that can associate a count to the collected image. The downstream section of said insect entry channel is slightly extended downwardly to allow the second InfraRed sensor to be housed, and particularly to hinder the exit of the insects captured in said pheromone reservoir, thereby preventing the insect cause crop damage and to avoid duplicate counts that may interfere with the quality of data collected by the equipment. The information collected by the camera and the Infra-Red sensor is subsequently stored and prepared for subsequent upload to the database dematerialized by the microprocessor (13). To the data collected by said photographic camera and by the second Infra-Red sensor, the spatial location information obtained from the Global Position System—GPS receiver 10, and the data collection time provided by said microprocessor, is associated. The collected image allows to automatically perform a biometric analysis to the captured insect, according to a set of standards and measures characterizing each species.

The data communication to the dematerialized integrating platform and the data reception and software update of said microprocessor component is done by means of a Global System for Mobile—GSM transmitter and receiver module (12) and a transmitter module and Wireless Fidelity receiver—WIFI (14). Said WIFI transmitter and receiver module is responsible for the communication between devices, where each of them assumes the signal amplifier function, allowing the set of equipment to be networked even in places where the WIFI signal coverage only reaches one equipment with the optimum signal strength.

The electronic components of the present invention are electrically powered by a lithium battery (11), continuously recharged by a photovoltaic panel (1) capable of generating sufficient power to provide an autonomy greater than two days of operation of the equipment. The present invention may also be fed electrically through a micro USB socket (9) located on its top. This socket serves simultaneously to make data communication in loco, very important in situations of total power failure or in case of failure or only to maintain and update software of the equipment and said microprocessor module (13).

The present invention can be used to capture and monitor a large diversity of insects by simply varying or securing the set of attractive means of the same, allowing their use in the most varied cultural sectors, as well as allowing to carry out the control and monitoring of species of insects considered to be harmful to public health, in particular in the control of insects vectors of infectious diseases.

The invention claimed is:

1. A insect capture, identification and counting machine, comprising a support structure incorporated in a waterproof housing (5) which houses insect inlet channels (2) and a colourless plastic ring (6) which incorporates two infrared sensors (4) and where a pheromone reservoir (8) engages by mechanical action, wherein said support structure housing a photovoltaic panel (1), a micro USB port (9), a rechargeable lithium battery (11), a Global System for Mobile (GSM) receiver and transmitter module (12), a Wireless Fidelity transmitter and receiver module (14), a photographic camera (3), a Global Position System (GPS) receiver (10) and a microprocessor (13);

the second Infra-Red sensor (4) and a photographic camera (3), incorporated in the colourless plastic ring (6) housing a LED lamp of Ultra Violet light (7);

said mechanical engagement between the colourless plastic ring (6) and the pheromone reservoir (8) allowing quick and efficient coupling and detachment;

the first infra-red sensor (4) is located in second segments of said insect inlet channels (2), the second infra-red sensor (4) is located in first downstream segments of the insect inlet channels (2) and the photographic camera (3) is located between the first and the second infra-red sensor (4);

the first infra-red sensor (4) being configured such that when detecting the entering of an insect in insect inlet channels (2) the standby mode of the photographic camera (3) switches on for the monitoring mode registering an image of the insect and the second infra-red sensor (4) being configured such that when detecting the passage of an insect associate a count to the collected image.

2. The machine according to claim 1 wherein the pheromone reservoir (8) can be constructed of plastic of various colours to allow the attraction of insects of different species and the colourless plastic ring (6) being of transparent aplastic so that the Ultra Violet light rays emitted by an LED Lamp (7) can disperse.

3. The machine according to claim 1, wherein the insect inlet channels (2) have different diameter anal geometric shape, allowing diffusion of the pheromone reservoir (8) and entry of insects of various sizes.

4. The machine according to claim 1, wherein the micro-USB input (9), the rechargeable lithium battery (11), the Global Position System—GPS receiver module (10), the module (12), the Wireless Fidelity transmitter and receiver module (14) and the microprocessor (13), can be housed anywhere in the machine in any direction and orientation.

5. The machine according to claim 1 further comprises image and sound capture equipment allowing the identification of insect species.

6. The machine according to claim 1, wherein the first downstream segments of said insect inlet channels (2) extend downwardly.

* * * * *